United States Patent Office 3,123,645
Patented Mar. 3, 1964

3,123,645
PROCESS FOR THE REDUCTION OF
AROMATIC COMPOUNDS
Alfred Hagenboecker, Basel, Switzerland, assignor to
Ciba Limited, Basel, Switzerland
No Drawing. Filed June 20, 1960, Ser. No. 37,102
Claims priority, application Switzerland July 3, 1959
3 Claims. (Cl. 260—580)

This invention is based on the observation that aromatic compounds containing a reducible group, for example, a nitro, nitroso or keto group, can be successfully reduced by introducing such an aromatic compound at room temperature or a raised temperature into a solution or suspension of a pyridine-iron compound in the ferrous state and maintaining the compound in contact with the solution or suspension until the reaction is complete.

The pyridine-iron compounds, some of which have been described in the literature, correspond to the general formula $$A_xFeAc_2$$

in which A represents pyridine, $x$ is a whole number of at least 1 and at most 20, and Ac represents the anion of a monobasic organic or inorganic acid, for example, formic acid, acetic acid or hydrochloric acid, and $Ac_2$ may also represent the anion of a dibasic acid, for example, sulfuric acid.

Instead of pyridine itself there may be used homologues of pyridine, for example, the picolines, lutidines or other pyridine homologues or mixtures thereof. The expressions "pyridine" and "pyridine-iron compound" are used herein in this more general sense when the context permits.

It is not necessary to use for the reduction a proportion of the pyridine-iron salt as large as the stoichiometric quantity, and it suffices to use a small fraction of the stoichiometric quantity. In this case, however, there must be present a sufficient quantity of iron in the form of iron powder or iron shavings. The addition of iron is necessary in order to reconvert into the ferrous state the pyridine-iron salt that is oxidized by the compound to be reduced.

In order that the reduction may be carried out in a reasonably short time, it is of advantage to use a proportion of the pyridine-iron salt that is equivalent to the quantity of iron salt formed by the quantity of acid that etches the iron in the Béchamp method of reduction.

The use of a substantially smaller proportion of the salt necessitates a considerably longer time for carrying out the reaction, because the compound to be reduced can then only be added in very small amounts, as it is necessary to avoid the introduction in one portion of a quantity of the compound to be reduced larger than can be reduced immediately by the quantity of ferrous salt present in the reduction medium.

It is not necessary to prepare the pyridine-iron compound in a separate operation. Thus, the disintegrated iron in the desired form may be stirred with a larger or smaller amount of water, than the selected quantity of acid is added, and, when the iron salt has formed, a quantity of pyridine is added which is equivalent to at least one half of the quantity of acid first added, but it may amount to any desired multiple of the quantity of acid used. Alternatively the pyridine-iron salt may be prepared by stirring iron powder with pyridine and water and, after adding the acid, heating the mixture for a short time.

At low concentrations the pyridine-iron salt dissolves to give a lemon yellow coloration, and at high concentrations and low temperatures the iron salt, especially the salt of hydrochloric acid, may partially separate out in the form of bright yellow crystals.

The pH-values of such solutions or suspensions are higher than the pH-values of iron suspensions which are prepared in the usual manner for Béchamp reductions. The pH-value is higher the larger the proportion of pyridine in relation to the acid. However, in the case of very large proportions of pyridine, for example, 16 mols of pyridine for one equivalent of acid, the pH-value is always at about 7, whereas a solution of 10 parts of pyridine in 100 parts of water has a pH-value above 9.

The reduction processes generally proceed in a very vigorous manner and are generally complete in a short time after the final quantity of the compound to be reduced has been added.

The process of the invention is basically applicable to all compounds which can be reduced by the Béchamp process. In certain cases undesired side reactions are avoided, for example in the reduction of 5:8-dichloronitronaphthalene, and better yields are obtained. The reduction, for example, of 1:5-dinitronaphthalene, which proceeds very unsatisfactorily in the Béchamp process, gives almost theoretical yields in the process of this invention and a diamine of very good quality is obtained.

The following examples illustrate the invention, the parts and percentages being by weight:

*Example 1*

80 parts of iron are stirred in 350 parts of water in a vessel provided with stirring mechanism and, after the addition of 75 parts of acetic acid, the mixture is stirred until the acetic acid has reacted completely with the iron. The whole is then heated to 80–90° C., and the mixture is filtered hot to remove the excess of iron.

The green filtrate is placed in a second vessel fitted with stirring mechanism and a condenser, and 395 parts of pyridine are added. At 80–90° C. there are then added in portions 25.95 parts of sodium 1-chloro-4-nitrobenzene-2-sulfonate. The amine is formed accompanied by the precipitation of red iron oxide. After boiling the mixture for a further hour, 170 patrs of sodium hydroxide solution of 30% strength are added. The iron is then completely precipitated. The pyridine and a part of the water are distilled off, and the mixture is filtered hot to remove residues of red iron oxide.

By titrating the mother liquor with nitrite it will be found that the 1-chloro-4-aminobenzene-2-sulfonic acid has been formed in good yield. The mother liquor can be worked up immediately, but the 1-chloro-4-aminobenzene-2-sulfonic acid can also be isolated by acidifying the mixture with mineral acid and salting out with sodium chloride.

*Example 2*

In a vessel provided with stirring mechanism and a reflux condenser 160 parts of ferrous chloride are dissolved in 300 parts of water, and 390 parts of pyridine are added. The pyridine-iron compound separates out in handsome yellow crystals in the form of a stiff magma.

The whole is then heated to 90–95° C. and a clear solution is obtained in which 12 parts of 5:8-dichloronitronaphthalene are added in small portions. The portions are so chosen that a test portion which has been withdrawn a short time after the addition of the nitro compound, when rendered alkaline with caustic soda solution, gives a colorless solution in alcohol. The whole is then boiled for one hour longer under reflux, and 335 parts of caustic soda solution of 30% strength are added. In this manner the iron is completely precipitated. Pyridine and water are then distilled off and the residue is exhaustively extracted with xylene. The xylene is driven out with steam. After cooling the mixture, the 5:8-dichloro-1-naphthylamine separates out in the distillation vessel in good yield and having a good quality.

Example 3

20 parts of iron powder are stirred in a vessel provided with stirring mechanism with 10 parts of water and 12.2 parts of hydrochloric acid of 30% strength and the whole is heated at 80–90° C. until the whole of the hydrochloric acid has formed ferrous chloride. Then 32 parts of pyridine are added, and undissolved residual iron is removed by filtering the mixture while hot.

The clear yellow filtrate, which on cooling tends to crystallize, is mixed in a second stirring vessel having a reflux condenser and thermometer with 85 parts of iron and the whole is heated to 90° C. The external heating is then stopped, and a total of 121 parts of 5:8-dichloro-1-nitronaphthalene are introduced in portions of about 6 parts each.

Each addition causes a vigorous liberation of heat which brings the reaction mixture to the boil. The next portion is not added until the reaction has subsided. The addition of the nitro compound may cease in two hours. About 10 minutes after the termination a test portion is withdrawn. This portion is rendered distinctly alkaline with caustic soda solution and extracted with boiling alcohol. The filtered extract is mixed with water, then the melting point of the precipitated amine is determined. The same test is repeated after about one hour. The melting point had not changed, so that the reaction was complete after the first test.

13.5 parts of caustic soda solution of 30% strength are added at 90° C. A test portion shows that the iron has been completely precipitated. The bulk of the pyridine is then distilled off, but the distillation of the pyridine may be dispensed with.

350 parts of xylene are then added, the contents of the vessel are boiled for ½ hour, the mixture is then filtered while hot, and the iron sludge is exhaustively extracted with xylene. The xylene is then expelled with steam, and the product that remains behind is granulated by pouring it into water, and is filtered off. The yield amounts to 98–99% of the theoretical yield.

Instead of proceeding in the manner described in the first paragraph of this example, 20 parts of iron powder may be stirred in 20 parts of water with 4.9 parts of sulfuric acid or 4.6 parts of formic acid or 6 parts of acetic acid in the manner described until the salt formation is complete. 32 parts of pyridine are then added, and the mixture is filtered while hot. From the clear yellow filtrates, the iron-pyridine compound is precipitated immediately by means of hydrochloric acid and cooling in the form of bright yellow crystals. On the other hand, when sulfuric acid or formic acid is used crystallization takes a longer time. The product produced with acetic acid has less tendency to crystallize.

By the addition of sodium chloride to the final filtrates a handsome crystalline yellow pyridine-iron compound precipitates after stirring for a short time. The solutions or suspensions acquire a dark coloration under the influence of atmospheric oxygen. The filtrates, with or without the crystalline precipitate, may each be mixed with 85 parts of iron in a second vessel fitted with stirring means and a reflux condenser, and the mixture heated to 90° C., and 121 parts of 1-nitro-5:8-dichloro-naphthalene subjected to reduction in the manner described above.

Example 4

In a vessel fitted with stirring means and a reflux condenser and thermometer 85 parts of iron powder are stirred in 25 parts of water, and the mixture is heated with 6 parts of glacial acetic acid until the whole of the acetic acid has reacted. 32 parts of pyridine are then added. There are then introduced 121 parts of 5:8-dichloro-1-nitronaphthalene in the manner described in Example 3, and the product is worked up in the same manner. The yield and quality of the product are the same as described in Example 3.

The same result is obtained by stirring 85 parts of iron powder in 25 parts of water and 32 parts of pyridine and then adding the 6 parts of acetic acid. After heating the whole at 80–90° C. for about one hour, the same reaction medium is obtained as that described above.

Example 5

The procedure is the same as described in Example 4, except that there are used, instead of 32 parts of pyridine, 38 parts of α-picoline or 38 parts of a mixture of β- and γ-picoline or 40 parts of a commercial mixture of pyridine bases which has a boiling range of 122–148° C. and is still miscible with water, or 50 parts of a commercial mixture of pyridine bases having a boiling range of 160–180° C. and is only slightly soluble in water.

The yield and quality of the product correspond to those of the product obtained in Example 3.

Example 6

In a vessel fitted with stirring means as described in Example 2, 145 parts of iron powder are stirred with 120 parts of water, and the mixture is heated with 10 parts of glacial acetic acid until the whole of the acetic acid has reacted. No pyridine is added.

121 parts of 5:8-dichloro-1-nitronaphthalene are then added in small portions at 93–95° C. The reaction is less vigorous than in the preceding examples, and the addition of the nitro compound takes a considerably longer time. When the addition of the nitro-compound is complete the whole is stirred for ½ hour, but the melting point of the compound is still unsatisfactory and a test portion dissolved in alcohol has a yellow coloration. Only after stirring the mixture for a longer time at about 95° C. is a solution of the test portion in alcohol colorless and the melting point of the product somewhat better. It is, however, distinctly lower than that of the test portions obtained in Exampes 1 and 2.

A considerably larger quantity of caustic soda solution is required to precipitate the dissolved iron that is required in the preceding examples. After precipitating the iron 350 parts of xylene are added, and a quantity of water is distilled off azeotropically until the reaction mixture has a temperature of 105–110° C. The removal of a part of the water is necessary as otherwise the product does not filter well. The product is then filtered off and worked up as described in the preceding examples.

In this case the yield is only 94%, the melting point of the product is unsatisfactory and the titration of the isolated amine (calculated for a molecular weight of 212) with nitrite exceeds 100%. Elementary analysis shows that chlorine has split off, from which it can be concluded that 13% of the dichloronaphthylamine has been converted into the monochloro derivative. The quantity of chlorine split off can be determined by extracting the iron residue with water at the boil, and determining the chlorine ions present in the aqueous extract. The chlorine value thus found corresponds to the excessive consumption of caustic soda solution, the elementary analysis of the amine and also the nitrite titre.

Corresponding tests applied to the products of Examples 3 and 4 show that no chlorine has been split off.

Example 7

The procedure is the same as described in Example 3, except that the quantity of pyridine is reduced from 32 parts to 8 parts. By working under otherwise identical conditions chlorine is split off, from which is can be concluded that 2.8% of the dichloronaphthalene derivative has been converted into monochloronaphthylamine.

Example 8

In a vessel fitted with stirring means and a reflux condenser 145 parts of iron powder are stirred with 60 parts of water and 10 parts of glacial acetic acid are added, and the whole is maintained at 80–90° C. until the acetic acid has been completely converted into iron acetate. 350 parts of pyridine are then added, and then 121 parts of 5:8-dichloro-1-nitronaphthalene are added at 90° C. The reduction proceeds well and when it is complete 22.5 parts of caustic soda solution of 30% strength are added. In this manner the iron is completely precipitated. The iron is then filtered off while hot, the iron sludge is washed with pyridine, and the pyridine is removed to a far-reaching extent by distillation finally in vacuo. The molten base is granulated by pouring it into cold water. The pyridine can also be removed by distillation with steam. The yield amounts to 98–99% of the theoretical yield, and there is no splitting off of chlorine.

The same result is obtained when pyridine is replaced by 2-picoline, or a mixture of 3- and 4-picoline or a cheap commercial mixture of pyridine bases.

*Example 9*

In a vessel fitted with stirring means and a reflux condenser 75 parts of iron powder are stirred with 20 parts of water and 18.2 parts of hydrochloric acid of 30% strength are added, and the whole is stirred, finally at 90° C. until the hydrochloric acid has been completely converted into ferrous chloride. After the addition of 100 parts of pyridine 38.25 parts of 2-nitro-4-methyl-1-oxybenzene are added in small portions at an external temperature of about 80° C. The reaction takes place very energetically. The whole is after-reduced for one to two hours, and then 55 parts by weight of caustic soda solution of 30% strength are added. In this manner the iron is precipitated and the aminocresol formed is converted into the sodium salt. 110 parts of pyridine and water are then distilled off. 300 parts of water are added, and the whole is boiled for about ½ hour and filtered while hot. The water-clear filtrate is poured into a vessel having stirring means which contains 36.5 parts of hydrochloric acid of 30% strength, the iron residue is exhaustively washed with 300 parts of boiling water and the washing water is united with the first filtrate. The filtrate is cooled indirectly to room temperature, and adjusted to a pH value of 5.5 to 6.0 by the addition of caustic soda solution. The 2-amino-paracresol which precipitates in handsome pale grey crystals is filtered off, washed with a small amount of water, and dried. The product dissolves to a clear solution in caustic soda solution and in hydrochloric acid, and melts at 135° C. The yield amounts to 89% of the theoretical yield.

The process is superior to the process described in FIAT Final Report No. 1313, page 27, which respect to the yield obtained and the simpler manner in which it can be carried out.

*Example 10*

In a vessel fitted with stirring means and a reflux condenser 175 parts of iron powder are stirred with 70 parts of water and heated with 10 parts of glacial acetic acid until the whole of the acid has reacted. There are then added 100 parts of pyridine or 100 parts of one of the three isomeric picolines or a mixture thereof or 100 parts of a commerical pyridine fraction having a boiling range of 122° C. to 148° C. At 75–85° C. there are then added 140 parts of sodium 1:3-dinitrobenzene-4-sulfonate. This addition must be made in small portions and while cooling externally, because there is a risk of excessive frothing due to the very vigorous reaction. When the addition is complete the whole is heated for a short time longer at 90–95° C. At that temperature 25 parts of caustic soda solution of 30% strength are added and 130 parts of pyridine bases and water are distilled off.

The product that separates out in the vessel as crystalline crusts is brought into solution by the addition of 300 parts of water and by boiling, and the whole is then filtered at the boiling temperature.

The iron sludge that remains behind as filter residue is exhaustively washed with water. It is of advantage to use the whole or a part of the washings to dissolve the next charge, if the resulting 1:3-diaminobenzene-4-sulfonic acid which is obtained in theoretical yield is not to be further worked up in solution, but is to be separated.

The filtrate is adjusted to a pH-value of 5.5 to 6.0 by the addition of acid, and 20% of its volume of sodium chloride is added and the whole is stirred for a few hours at 10–20° C. The 1:3-diaminobenzene-4-sulfonic acid which separates out in white crystals is filtered off and dried.

*Example 11*

In a vessel fitted with stirring means and a reflux condenser 85 parts of iron powder are reacted in 25 parts of water with 10 parts of glacial acetic acid up to 90° C. 55 parts of pyridine are then added and 43 parts of 1-nitroso-2-naphthol are introduced in portions. The whole is stirred at 90–95° C. until the green coloration of the initially formed iron compound has disappeared.

There are then added 57 parts of caustic soda of 30% strength, and the mixture is diluted with water to 500 parts. The solution at a temperature of about 90° C. is then filtered into a vessel in which 55 parts of hydrochloric acid of 30% strength have been placed. At the end of the filtration the pH-value of the filtrate is about 4.5. The 1-amino-2-naphthol precipitates in good yield in the form of brownish crystals. The product is readily soluble in caustic soda solution and dilute hydrochloric acid.

From the hydrochloric acid solution the hydrochloride of the product can be precipitated in the form of handsome colorless crystals by the addition of concentrated hydrochloric acid.

*Example 12*

In a vessel fitted with stirring means and a reflux condenser 12 parts of iron powder are stirred with 100 parts of water, 2.45 parts of hydrochloric acid of 30% strength are added, and the whole is heated at 80–90° C. until the hydrochloric acid has reacted with the iron. 12.8 parts of pyridine are then added, and subsequently 20.8 parts of anthraquinone are introduced. After stirring the mixture for one hour it is diluted with 300 parts of water, and 40 parts of caustic soda solution of 30% strength are added.

When the initially yellowish green reaction mixture has become uniformly dark red, it is filtered hot into a vessel fitted with stirring means, which contains 50 parts of hydrochloric acid of 30% strength and 100 parts of water. Upon running the red filtrate into the hydrochloric acid 9:10-dihydroxy-anthracene separates out in the form of greenish yellow crystals.

An alcoholic solution of the product has a bright greenish yellow fluorescence. The latter disappears when air is blown in accompanied by the precipitation of anthraquinone.

*Example 13*

In a vessel fitted with stirring means and a reflux condenser 40 parts of iron are stirred in 25 parts of water, 6 parts of glacial acetic acid are added, and the whole is heated at 90° C. until the acetic acid has completely reacted with the iron. 32 parts of pyridine are then added, and 10 parts of 6:6'-diethoxy-thioindigo are introduced. The whole is stirred at 90–95° C. until dyestuff is no longer visible. There are then added 50 parts of caustic soda solution of 30% strength and 600 parts of water. At 90° C. the mixture is filtered, and the iron residue is washed with hot caustic soda solution of about 0.5% strength. The resulting leuco-compound can be precipitated in the filtrate by acidification or by the introduction of carbon dioxide.

Example 14

In a vessel provided with an external jacket for heating or cooling and with stirring means and a reflux condenser 100 parts of iron are stirred with 25 parts of water and 8 parts of glacial acetic acid, and the mixture is heated until the whole of the acetic acid has reacted. There are then added 200 parts of pyridine, and the temperature of the reaction mixture is adjusted to 70–75° C. by sutiably adjusting the cooling water in the jacket.

There are then introduced in small portions 54.5 parts of 1:5-dinitronaphthalene. As the reaction is strongly exothermic the introduction must be so regulated that a fresh portion must be added only after the internal temperature has fallen to the temperature of the cooling liquid in the jacket. When the addition is complete, the whole is boiled under reflux for a further hour, and 20 parts of caustic soda solution of 30% strength are added to precipitate the iron. The mixture is filtered at the boiling temperature, and the iron sludge is washed exhaustively with boiling pyridine. The pyridine is then distilled off by indirect heating in vacuo until the reaction mixture has a temperature of 130–135° C. 600 parts of water are then added and the resulting 1:5-diaminonaphthalene obtained in good quality and in practically theoretical yield is filtered off and dried.

When, instead of pure dinitronaphthalene (melting point 217.5° C.), there is used a commercial product, for example, the product that melts at 206–210° C., it is desirable to distil off the pyridine without the use of reduced pressure until an internal temperature of 130–135° C. has been obtained, and then to dilute the mixture with 600 parts of water. In this manner 37.5 parts of 1:5-dinaphthylamine melting at 183–185° C. uncorrected are obtained. This corresponds to 95% of the theoretical yield. By working up the mother liquor containing pyridine a further 1.5 parts of a mixture of naphthylamines are obtained.

The reduction can also be carried out with small quantities of pyridine, for example instead of 200 parts only 100 parts, and the pyridine may be distilled off after the addition of caustic soda solution but before removal of the iron residue by filtration. The 1:5-diaminonaphthalene can then be extracted with another solvent, for example, xylene, glycol monoethyl ether or acetone. The xylene can also be removed from the extract by steam distillation. When commercial 1:5-dinitronaphthalene is used it is however, of advantage to concentrate the extracts by distillation until crystallization begins and then to cool the mixture. The 1:5-diaminonaphthalene then crystallizes as a very pure product.

The reduction described in this example is superior to the process described in British specification No. 807,383 in that a better yield is obtained. Furthermore, a considerably lower consumption of heat is required for recovery of the solvent.

What is claimed is:

1. A process for the reduction of a member selected from the group consisting of chloro-nitro-benzene-sulfonic acid, dinitro-benzene-sulfonic acid, nitro-para-cresol, nitro-dichloro-naphthalene, dinitro-naphthalene and nitroso-naphthol to the corresponding amine, which comprises heating the member to a temperature within the range from 70° C. to boiling in an aqueous medium containing, as reducing agent, a water-soluble ferrous pyridine salt of an acid selected from the group consisting of formic acid, acetic acid, hydrochloric acid and sulfuric acid, the pyridine of said salt being a member selected from the group consisting of pyridine and a pyridine base having a boiling point of at most 180° C.

2. A process for the reduction of a member selected from the group consisting of chloro-nitro-benzene-sulfonic acid, dinitro-benzene-sulfonic acid, nitro-para-cresol, nitro-dichloro-naphthalene, dinitro-naphthalene and nitroso-naphthol to the corresponding amine, which comprises heating the member to a temperature within the range from 70° C. to boiling in an aqueous medium containing a water-soluble reducing agent of the formula $$A_xFeAc_2$$

in which

A is a member selected from the group consisting of pyridine and a pyridine base having a boiling point of at most 180° C.;

$x$ is a positive integer of at most 20; and $Ac_2$ is a member selected from the group consisting of the anion of sulfuric acid, two anions of formic acid, two anions of acetic acid and two anions of hydrochloric acid.

3. In the reduction of the nitro group of dichloro-nitro-naphthalene to —NH$_2$ by heating in an aqueous medium containing a reducing agent, the improvement wherein the temperature of the aqueous medium is maintained in the range from 70° C. to boiling and the reducing agent is a water-soluble salt of the formula $$A_xFeAc_{(3-n)}$$

wherein

A is a member selected from the group consisting of pyridine and a pyridine base having a boiling point of at most 180° C.;

$x$ is a positive whole number of at most 20;

Ac is an anion of an acid selected from the group consisting of formic acid, acetic acid, hydrochloric acid and sulfuric acid; and $n$ is the valence of the anion.

References Cited in the file of this patent

UNITED STATES PATENTS

| | | |
|---|---|---|
| 1,784,379 | Munch | Dec. 9, 1930 |
| 1,810,758 | Drescher et al. | June 16, 1931 |
| 2,631,167 | Werner | Mar. 10, 1953 |
| 2,765,309 | Eckert et al. | Oct. 2, 1956 |
| 2,827,463 | Schaeffer | Mar. 18, 1958 |
| 2,842,552 | Schulze | July 8, 1958 |
| 2,956,082 | Schenck | Oct. 11, 1960 |